United States Patent
Grassl et al.

(10) Patent No.: US 11,274,064 B2
(45) Date of Patent: Mar. 15, 2022

(54) SET CONTROL COMPOSITION FOR CEMENTITIOUS SYSTEMS

(71) Applicant: Construction Research And Technology GmbH, Trostberg (DE)

(72) Inventors: Harald Grassl, Trostberg (DE); Joachim Dengler, Trostberg (DE); Alexander Schoebel, Trostberg (DE); Gerhard Albrecht, Prien am Chiemsee (DE); Maxim Pulkin, Trostberg (DE)

(73) Assignee: Construction Research & Technology GmbH, Trostberg (DE)

( * ) Notice: Subject to any disclaimer, the term of this patent is extended or adjusted under 35 U.S.C. 154(b) by 102 days.

(21) Appl. No.: 16/757,216

(22) PCT Filed: Oct. 18, 2018

(86) PCT No.: PCT/EP2018/078576
§ 371 (c)(1),
(2) Date: Apr. 17, 2020

(87) PCT Pub. No.: WO2019/077050
PCT Pub. Date: Apr. 25, 2019

(65) Prior Publication Data
US 2021/0122676 A1   Apr. 29, 2021
US 2022/0002198 A9   Jan. 6, 2022

(30) Foreign Application Priority Data
Oct. 20, 2017 (EP) .................................. 17197480

(51) Int. Cl.
| | | |
|---|---|---|
| C04B 24/12 | (2006.01) |
| C04B 14/26 | (2006.01) |
| C04B 14/30 | (2006.01) |
| C04B 24/00 | (2006.01) |
| C04B 24/04 | (2006.01) |
| C04B 28/04 | (2006.01) |
| C04B 28/06 | (2006.01) |
| C04B 103/22 | (2006.01) |
| C04B 103/40 | (2006.01) |

(52) U.S. Cl.
CPC ............ *C04B 24/123* (2013.01); *C04B 14/26* (2013.01); *C04B 14/30* (2013.01); *C04B 24/003* (2013.01); *C04B 24/04* (2013.01); *C04B 28/04* (2013.01); *C04B 28/065* (2013.01); *C04B 2103/22* (2013.01); *C04B 2103/408* (2013.01)

(58) Field of Classification Search
CPC ....... C04B 14/26; C04B 14/30; C04B 24/003; C04B 24/04; C04B 24/123; C04B 28/04; C04B 28/062; C04B 2103/22; C04B 2103/408
See application file for complete search history.

(56) References Cited

U.S. PATENT DOCUMENTS 4,190,454 A   2/1980   Yamagisi et al.
4,888,412 A   12/1989   Ebel et al.

FOREIGN PATENT DOCUMENTS

| DE | 2857396 C2 | 6/1985 |
| EP | 0301406 A2 | 2/1989 |
| EP | 0568865 A1 | 11/1993 |
| WO | 2014151388 A1 | 9/2014 |

OTHER PUBLICATIONS

International Search Report for application No. PCT/EP2018/078576, dated Dec. 5, 2018, 3 pages.
International Written Opinion for application No. PCT/EP2018/078576, dated Dec. 5, 2018, 5 pages.

*Primary Examiner* — Anthony J Green
(74) *Attorney, Agent, or Firm* — Curatolo Sidoti Co., LPA; Salvatore A. Sidoti; Brittany L. Kulwicki

(57) ABSTRACT

A set control composition for cementitious systems comprises (a) an amine-glyoxylic acid condensate, and (b) at least one of (i) a borate source and (ii) a carbonate source. The carbonate source is selected from inorganic carbonates having an aqueous solubility of 0.1 $gL^{-1}$ or more, and organic carbonates. The set control composition improves workability of cementitious systems for prolonged periods of time without compromising early compressive strength. Due to the retarding action of the set control composition, the dosage of dispersant(s) necessary to obtain a desired flowability of the cementitious system can be reduced.

17 Claims, No Drawings

SET CONTROL COMPOSITION FOR CEMENTITIOUS SYSTEMS

CROSS REFERENCE TO RELATED APPLICATIONS

This application is a national stage application of International Application No. PCT/EP2018/078576, filed Oct. 18, 2018, which claims priority from European Patent Application No. 17197480.1, filed Oct. 20, 2017, which applications are incorporated herein by reference.

The present invention relates to a set control composition for cementitious systems and a construction material composition comprising the set control composition.

It is known that dispersants are added to aqueous slurries or pulverulent hydraulic binders for improving their workability, i.e. kneadability, spreadability, sprayability, pumpability or flowability. Such admixtures are capable of preventing the formation of solid agglomerates and of dispersing the particles already present and those newly formed by hydration and in this way improving the workability. This effect is utilized in the preparation of construction material compositions which contain hydraulic binders, such as cement, lime, gypsum, hemihydrate or anhydrite. In order to convert the pulverulent binders into a ready-to-use processible form, substantially more mixing water is required than would be necessary for the subsequent hydration and hardening process. The voids formed in the concrete body by the excess of water which subsequently evaporates lead to poor mechanical strength and resistance. In order to reduce the excess proportion of water at a predetermined processing consistency and/or to improve the workability at a predetermined water/binder ratio, admixtures are used which are generally referred to as water-reducing agents or plasticizers.

Upon hydration of the cementitious system, generally ettringite is generated in a rapid reaction. This reaction is responsible for the development of early compressive strength of the cementitious composition. However, the newly formed minute ettringite crystals tend to deteriorate the workability or flowability of the cementitious composition. It has been known to add set control agents or retarders to the composition in order to delay the reaction and improve workability. The retarders delay the hydration onset by inhibiting the dissolution of the reactive cement components, in particular aluminates, and/or by masking the calcium ions thereby slowing down the hydration reaction.

DE 42 17 181 A1 discloses condensation products of melamine and glyoxylic acids as additives for hydraulic binders.

There is a need for further set control compositions for cementitious systems. In this invention the term cementitious systems comprises latent hydraulic binders, preferably blast furnace slag, and mixtures of cement and latent hydraulic binders, preferably mixtures of cement and blast furnace slag.

Preferably the term cementitious system comprises hydraulic binders, preferably cement, more preferably Ordinary Portland Cement (OPC).

In particular, there is a need for set control compositions that effectively improve workability of cementitious systems for prolonged periods of time without compromising early compressive strength. In particular the compositions should show sufficient open time, i.e., the time until initial setting, good workability during said open time as characterized, for example by adequate slump flow over time, and fast setting.

The above problems are solved by a set control composition for cementitious systems comprising
a) an amine-glyoxylic acid condensate,
b) at least one of (i) a borate source and (ii) a carbonate source, wherein the carbonate source is selected from inorganic carbonates having an aqueous solubility of 0.1 $gL^{-1}$ or more, and organic carbonates.

It has surprisingly been found that components a) and b) of the set control composition according to the invention act in a synergistic fashion. Due to the excellent retarding action of the inventive set control composition, the dosage of dispersant(s) necessary to obtain a given flowability of the cementitious system can be reduced.

It is believed that the amine-glyoxylic acid condensate suppresses the formation of ettringite from the aluminate phases originating from the hydraulic binder by stabilizing the aluminate phases and thereby slowing down the dissolution of the aluminate phases. The presence of the borate or carbonate source ensures that the mixing water is initially highly concentrated in borate or carbonate ions. These ions are believed to inhibit the crystallization of ettringite.

Component a) is an amine-glyoxylic acid condensate. The term "amine-glyoxylic acid condensate" is intended to mean a condensate of glyoxylic acid with a compound containing amino or amido groups reactive with aldehydes. Examples of compounds containing aldehyde-reactive amino or amido groups include urea, thiourea, melamine, guanidine, acetoguanamine, benzoguanamine and other acylguanamines and polyacrylamide.

Preferably, the amine-glyoxylic acid condensate is a melamine-glyoxylic acid condensate, a urea-glyoxylic acid condensate, a melamine-urea-glyoxylic acid condensate or a polyacrylamide-glyoxylic acid condensate. Urea-glyoxylic acid condensates are particularly preferred.

The amine-glyoxylic acid condensates are obtainable by reacting glyoxylic acid with a compound containing aldehyde-reactive amino or amido groups. The glyoxylic acid can be used as an aqueous solution or as glyoxylic acid salts, preferably glyoxylic acid alkaline metal salts. Likewise, the amine compound can be used as salt, for example as guanidinium salts. In general, the amine compound and the glyoxylic acid are reacted in a molar ratio of 0.5 to 2 equivalents, preferably 1 to 1.3 equivalents, of glyoxylic acid per aldehyde-reactive amino or amido group. The reaction is carried out at a temperature of 0 to 120° C., preferably 25 to 105° C., most preferably 50 to 105° C. The pH value is preferably from 0 to 8. The viscous products obtained in the reaction can be used as such, adjusted to a desired solids content by dilution or concentration or evaporated to dryness by, e.g., spray-drying, drum-drying, or flash-drying.

In general, the amine-glyoxylic acid condensates have molecular weights in the range of from 500 to 25000 g/mol, preferably 1000 to 10000 g/mol, particularly preferred 1000 to 5000 g/mol. The molecular weight is measured by the gel permeation chromatography method (GPC) as indicated in detail in the experimental part.

Component b) is at least one of (i) a borate source and (ii) a carbonate source.

The borate source usually comprises a rapidly soluble, inexpensive, borate compound. Suitable borate sources include borax, boric acid, and sodium tetraborate.

The carbonate source may be an inorganic carbonate having an aqueous solubility of 0.1 $gL^{-1}$ or more. The aqueous solubility of the inorganic carbonate is determined in water (starting at pH 7) at 25° C. These characteristics are well known to those skilled in the art. The inorganic carbonate may be selected from alkaline metal carbonates such as potassium carbonate, sodium carbonate or lithium carbonate, and alkaline earth metal carbonates satisfying the required aqueous solubility, such as magnesium carbonate. It is also possible to use guanidine carbonate as an inorganic carbonate, as well as sodium hydrogencarbonate and potassium hydrogencarbonate.

Alternatively, the carbonate source is selected from organic carbonates. "Organic carbonate" denotes an ester of carbonic acid. The organic carbonate is hydrolyzed in the presence of the cementitious system to release carbonate ions. In an embodiment, the organic carbonate is selected from ethylene carbonate, propylene carbonate, glycerol carbonate, dimethyl carbonate, di(hydroxyethyl)carbonate or a mixture thereof, preferably ethylene carbonate, propylene carbonate, and glycerol carbonate or a mixture thereof, and in particular ethylene carbonate and/or propylene carbonate. Mixtures of inorganic carbonates and organic carbonates can as well be used.

The set control composition is preferably an aqueous system and has a pH higher than or equal to 6.5 or the set control composition is preferably a powder and develops a pH higher than or equal to 6.5 when an aqueous system is formed from the powder by adding water to the powder. Preferably the pH for the aqueous systems, as well as for the powders, is higher than or equal to 7.5 more preferably higher than or equal to 8.5 and most preferably higher than or equal to 9.5. The pH plays a role in stabilizing the carbonates of the compound b). At low pH values it is supposed that the carbonates become instable and form carbon dioxide, which disappears from the set control composition.

In the case of aqueous systems it is possible to have a solution, a dispersion or an emulsion as the aqueous system, preferable is a solution. More preferably the water contents of the aqueous system is lower than 80 weight %, more preferably lower than 60 weight %.

In the case of an aqueous system as the set control composition, the following test conditions are preferably used for determining the pH value: the pH is preferably measured at 25° C. and atmospheric pressure by a pH electrode.

In the case of a powder as the set control composition, the following test conditions are preferably used for determining the pH value of the powder: water is added to the powder set control composition in an amount that the water content is 90 weight %, preferably distilled water is added. The pH is measured at 25° C. and atmospheric pressure by a pH electrode.

The weight ratio of component a) to component b) is in general in the range from about 10:1 to about 1:100, preferably about 5:1 to about 1:50 or about 1:1 to about 1:30.

In an embodiment, the set control composition further comprises c) a component selected from
   polycarboxylic acids or salts thereof whose milliequivalent number of carboxyl groups is 5.00 meq/g or higher, preferably 5.00 to 15.00 meq/g, assuming all the carboxyl groups to be in unneutralized form;
   phosphonates which comprise two or three phosphonate groups and no carboxyl groups and
   α-hydroxy carboxylic acids or salts thereof.

By the term polycarboxylic acid, as used herein, is meant a compound or polymer having two or more carboxyl groups to the molecule.

Suitable polycarboxylic acids are low molecular weight polycarboxylic acids (having a molecular weight of, e.g., 500 or lower), in particular aliphatic polycarboxylic acids, such as oxalic acid, malonic acid, succinic acid, glutaric acid, adipic acid, pimelic acid, fumaric acid, maleic acid, itaconic acid, citraconic acid, mesaconic acid, malic acid.

Phosphonoalkylcarboxylic acids, such as 1-phosphonobutane-1,2,4-tricarboxylic acid, 2-phosphonobutane-1,2,4-tricarboxylic acid, 3-phosphonobutane-1,2,4-tricarboxylic acid, 4-phosphonobutane-1,2,4-tricarboxylic acid, 2,4-diphosphonobutane-1,2,4-tricarboxylic acid, 2-phosphonobutane-1,2,3,4-tetracarboxylic acid, 1-methyl-2-phosphonopentane-1,2,4-tricarboxylic acid, or 1,2-phosphonoethane-2-dicarboxylic acid; amino carboxylic acids, such as ethylenediamine tetra acetic acid, or nitrilotriacetic acid; polymeric carboxylic acids, such as homopolymers of acrylic acid, homopolymers of methacrylic acid, polymaleic acid, copolymers such as ethylene/acrylic acid copolymer and ethylene/methacrylic acid copolymer.

In general, the molecular weight of the polymeric carboxylic acids is in the range of from 1000 to 30000 g/mol, preferably 1000 to 10 000 g/mol. The molecular weight is measured by the gel permeation chromatography method (GPC) as indicated in detail in the experimental part.

Phosphonates, which comprise two or three phosphonate groups and no carboxyl groups are preferably 1-hydroxyethylidene-1,1-diphosphonic acid (HEDP), aminotris(methylenephosphonic acid) (ATMP) or [[(2-hydroxyethyl)imino]bis(methylene)]bisphosphonic acid and mixtures thereof. The respective chemical formulae of the preferred di- or triphosphonates are given in the following:

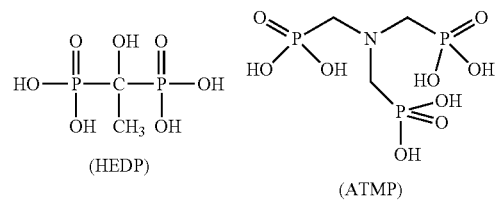 [SMILES: CC(O)(P(=O)(O)O)P(=O)(O)O ; O=P(O)(O)CN(CP(=O)(O)O)CP(=O)(O)O]

(HEDP)

(ATMP)

[[(2-hydroxyethyl)imino]bis(methylene)]bisphosphonic Acid

The phosphonates are retarders for cementitious systems and have the advantage that the open time is prolonged.

Suitable α-hydroxy carboxylic acids or salts thereof include tartaric acid, citric acid, glycolic acid, gluconic acid, and their salts and mixtures thereof. Sodium gluconate is particularly preferred.

The weight ratio of component a) to component c) is in general in the range from about 10:1 to about 1:10, preferably about 5:1 to about 1:5 or about 3:1 to about 1:1.

The dosage of the sum of a) and b), or a), b) and c) in weight % of inorganic binder is from 0.05 to 20%, preferably 0.1 to 15%, most preferably 0.1 to 2%.

Preferably, the set control composition according to the invention additionally comprises at least one dispersant for inorganic binders, especially a dispersant for cementitious mixtures like concrete or mortar.

It will be appreciated that a number of useful dispersants contain carboxyl groups, salts thereof or hydrolysable groups releasing carboxyl groups upon hydrolysis. Preferably, the milliequivalent number of carboxyl groups contained in these dispersant (or of carboxyl groups releasable upon hydrolysis of hydrolysable groups contained in the dispersant) is 4.90 meq/g or lower, assuming all the carboxyl groups to be in unneutralized form.

Examples of useful dispersants include
comb polymers having a carbon-containing backbone to which are attached pendant cement-anchoring groups and polyether side chains,
non-ionic comb polymers having a carbon-containing backbone to which are attached pendant hydrolysable groups and polyether side chains, the hydrolysable groups upon hydrolysis releasing cement-anchoring groups,
sulfonated melamine-formaldehyde condensates,
lignosulfonates,
sulfonated ketone-formaldehyde condensates,
sulfonated naphthalene-formaldehyde condensates,
phosphonate containing dispersants, preferably the phosphonate containing dispersants comprise at least one polyalkylene glycol unit,
cationic (co)polymers and
mixtures thereof.

In an embodiment, the dispersant is a comb polymer having a carbon-containing backbone to which are attached pendant cement-anchoring groups and polyether side chains. The cement-anchoring groups are anionic and/or anionogenic groups such as carboxylic groups, phosphonic or phosphoric acid groups or their anions. Anionogenic groups are the acid groups present in the polymeric dispersant, which can be transformed to the respective anionic group under alkaline conditions.

Preferably, the structural unit comprising anionic and/or anionogenic groups is one of the general formulae (Ia), (Ib), (Ic) and/or (Id):

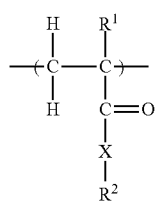

Ia wherein
$R^1$ is H, $C_1$-$C_4$ alkyl, $CH_2COOH$ or $CH_2CO$—X—$R^3$, preferably H or methyl;
X is NH—$(C_nH_{2n})$ or O—$(C_nH_{2n})$ with n=1, 2, 3 or 4, or a chemical bond, the nitrogen atom or the oxygen atom being bonded to the CO group;
$R^2$ is $PO_3M_2$ or O—$PO_3M_2$; or, if X is not present, $R^2$ is OM;
$R^3$ is $PO_3M_2$, or O—$PO_3M_2$;

(Ib)

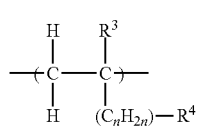

Ib wherein
$R^3$ is H or $C_1$-$C_4$ alkyl, preferably H or methyl;
n is 0, 1, 2, 3 or 4;
$R^4$ is $PO_3M_2$, or O—$PO_3M_2$;

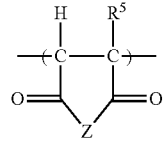

Ic wherein
$R^5$ is H or $C_1$-$C_4$ alkyl, preferably H;
Z is O or $NR^7$;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$, and
n is 1, 2, 3 or 4;

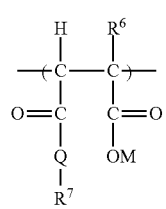

Id wherein
$R^6$ is H or $C_1$-$C_4$ alkyl, preferably H;
Q is $NR^7$ or O;
$R^7$ is H, $(C_nH_{2n})$—OH, $(C_nH_{2n})$—$PO_3M_2$, $(C_nH_{2n})$—$OPO_3M_2$, $(C_6H_4)$—$PO_3M_2$, or $(C_6H_4)$—$OPO_3M_2$,
n is 1, 2, 3 or 4; and
where each M independently is H or a cation equivalent.

Preferably, the structural unit comprising a polyether side chain is one of the general formulae (IIa), (IIb), (IIc) and/or (IId):

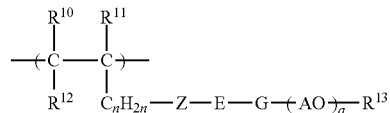

IIa wherein
$R^{10}$, $R^{11}$ and $R^{12}$ independently of one another are H or $C_1$-$C_4$ alkyl, preferably H or methyl;
Z is O or S;
E is $C_2$-$C_6$ alkylene, cyclohexylene, $CH_2$—$C_6H_{10}$, 1,2-phenylene, 1,3-phenylene or 1,4-phenylene;
G is O, NH or CO—NH; or
E and G together are a chemical bond;
A is $C_2$-$C_5$ alkylene or $CH_2CH(C_6H_5)$, preferably $C_2$-$C_3$ alkylene;
n is 0, 1, 2, 3, 4 or 5;
a is an integer from 2 to 350, preferably 10 to 150, more preferably 20 to 100;
$R^{13}$ is H, an unbranched or branched $C_1$-$C_4$ alkyl group, CO—$NH_2$ or $COCH_3$;

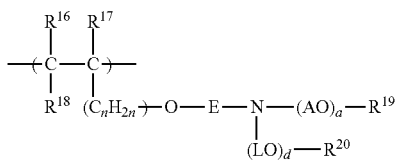
IIb wherein $R^{16}$, $R^{17}$ and $R^{18}$ independently of one another are H or $C_1$-$C_4$ alkyl, preferably H;

E is $C_2$-$C_6$ alkylene, cyclohexylene, $CH_2$—$C_6H_{10}$, 1,2-phenylene, 1,3-phenylene, or 1,4-phenylene, or is a chemical bond;

A is $C_2$-$C_5$ alkylene or $CH_2CH(C_6H_5)$, preferably $C_2$-$C_3$ alkylene;

n is 0, 1, 2, 3, 4 and/or 5;

L is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

d is an integer from 1 to 350, preferably 10 to 150, more preferably 20 to 100;

$R^{19}$ is H or $C_1$-$C_4$ alkyl;

$R^{20}$ is H or $C_1$-$C_4$ alkyl; and n is 0, 1, 2, 3, 4 or 5;

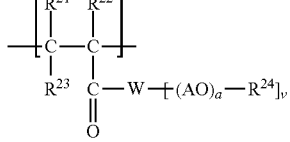
IIc wherein $R^{21}$, $R^{22}$ and $R^{23}$ independently are H or $C_1$-$C_4$ alkyl, preferably H;

W is O, $NR^{25}$, or is N;

V is 1 if W=O or $NR^{25}$, and is 2 if W=N;

A is $C_2$-$C_5$ alkylene or $CH_2CH(C_6H_5)$, preferably $C_2$-$C_3$ alkylene;

a is an integer from 2 to 350, preferably 10 to 150, more preferably 20 to 100;

$R^{24}$ is H or $C_1$-$C_4$ alkyl;

$R^{25}$ is H or $C_1$-$C_4$ alkyl;

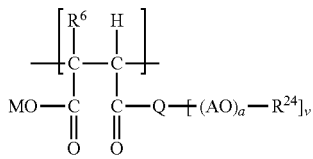
IId wherein $R^6$ is H or $C_1$-$C_4$ alkyl, preferably H;

Q is $NR^{10}$, N or O;

V is 1 if W=O or $NR^{10}$ and is 2 if W=N;

$R^{10}$ is H or $C_1$-$C_4$ alkyl;

A is $C_2$-$C_5$ alkylene or $CH_2CH(C_6H_5)$, preferably $C_2$-$C_3$ alkylene; and a is an integer from 2 to 350, preferably 10 to 150, more preferably 20 to 100.

The molar ratio of structural units (I) to structural units (II) varies from 1/3 to about 10/1, preferably 1/1 to 10/1, more preferably 3/1 to 6/1. The polymeric dispersants comprising structural units (I) and (II) can be prepared by conventional methods, for example by free radical polymerization. The preparation of the dispersants is, for example, described in EP0894811, EP1851256, EP2463314, and EP0753488.

More preferably, the dispersant is selected from the group of polycarboxylate ethers (PCEs). In PCEs, the anionic groups are carboxylic groups and/or carboxylate groups. The PCE is preferably obtainable by radical copolymerization of a polyether macromonomer and a monomer comprising anionic and/or anionogenic groups. Preferably, at least 45 mol-%, preferably at least 80 mol-% of all structural units constituting the copolymer are structural units of the polyether macromonomer or the monomer comprising anionic and/or anionogenic groups.

A further class of suitable comb polymers having a carbon-containing backbone to which are attached pendant cement-anchoring groups and polyether side chains comprise structural units (III) and (IV):

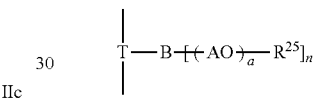
III wherein

T is phenyl, naphthyl or heteroaryl having 5 to 10 ring atoms, of which 1 or 2 atoms are heteroatoms selected from N, O and S;

n is 1 or 2;

B is N, NH or O, with the proviso that n is 2 if B is N and n is 1 if B is NH or O;

A is an $C_2$-$C_5$ alkylene or $CH_2CH(C_6H_5)$;

a is an integer from 1 to 300;

$R^{25}$ is H, $C_1$-$C_{10}$ alkyl, $C_5$-$C_8$ cycloalkyl, aryl, or heteroaryl having 5 to 10 ring atoms, of which 1 or 2 atoms are heteroatoms selected from N, O and S;

where the structural unit (IV) is selected from the structural units (IVa) and (IVb):

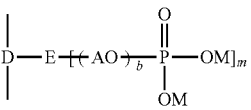
IVa wherein

D is phenyl, naphthyl or heteroaryl having 5 to 10 ring atoms, of which 1 or 2 atoms are heteroatoms selected from N, O and S;

E is N, NH or O, with the proviso that m is 2 if E is N and m is 1 if E is NH or O;

A is $C_2$-$C_5$ alkylene or $CH_2CH(C_6H_5)$;

b is an integer from 0 to 300;

M independently is H or a cation equivalent;

IVb wherein
V is phenyl or naphthyl and is optionally substituted by 1 to 4 radicals, preferably two radicals selected from $R^8$, OH, $OR^8$, $(CO)R^8$, COOM, $COOR^8$, $SO_3R^8$ and $NO_2$;
$R^7$ is COOM, $OCH_2COOM$, $SO_3M$ or $OPO_3M_2$;
M is H or a cation equivalent; and
$R^8$ is $C_1$-$C_4$ alkyl, phenyl, naphthyl, phenyl-$C_1$-$C_4$ alkyl or $C_1$-$C_4$ alkylphenyl.

Polymers comprising structural units (III) and (IV) products are obtainable by polycondensation of an aromatic or heteroaromatic compound having a polyoxyalkylene group attached to the aromatic or heteroaromatic core, an aromatic compound having a carboxylic, sulfonic or phosphate moiety, and an aldehyde compound such as formaldehyde.

In an embodiment, the dispersant is a non-ionic comb polymer having a carbon-containing backbone to which are attached pendant hydrolysable groups and polyether side chains, the hydrolysable groups upon hydrolysis releasing cement-anchoring groups. Conveniently, the structural unit comprising a polyether side chain is one of the general formulae (IIa), (IIb), (IIc) and/or (IId) discussed above. The structural unit having pendant hydrolysable groups is preferably derived from acrylic acid ester monomers, more preferably hydroxyalkyl acrylic monoesters and/or hydroxyalkyl diesters, most preferably hydroxypropyl acrylate and/or hydroxyethyl acrylate. The ester functionality will hydrolyze to acid groups upon exposure to water, and the resulting acid functional groups will then form complexes with the cement component.

Suitable sulfonated melamine-formaldehyde condensates are of the kind frequently used as plasticizers for hydraulic binders (also referred to as MFS resins). Sulfonated melamine-formaldehyde condensates and their preparation are described in, for example, CA 2 172 004 A1, DE 44 1 1 797 A1, U.S. Pat. Nos. 4,430,469, 6,555,683 and CH 686 186 and also in Ullmann's Encyclopedia of Industrial Chemistry, 5th Ed., vol. A2, page 131, and Concrete Admixtures Handbook—Properties, Science and Technology, 2. Ed., pages 411, 412. Preferred sulfonated melaminesulfonate-formaldehyde condensates encompass (greatly simplified and idealized) units of the formula

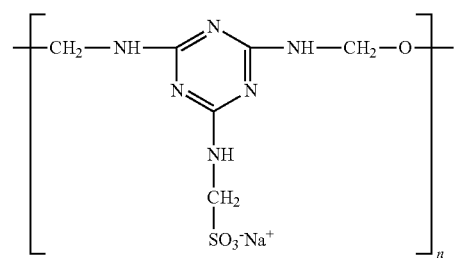

in which n stands generally for 10 to 300. The molar weight is situated preferably in the range from 2500 to 80 000. Additionally to the sulfonated melamine units it is possible for other monomers to be incorporated by condensation. Particularly suitable is urea. Moreover, further aromatic units as well may be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. An example of melaminesulfonate-formaldehyde condensates are the Melment® products distributed by BASF Construction Solutions GmbH.

Suitable lignosulfonates are products which are obtained as by-products in the paper industry. They are described in Ullmann's Encyclopedia of Industrial Chemistry, 5th Ed., vol. A8, pages 586, 587. They include units of the highly simplified and idealizing formula

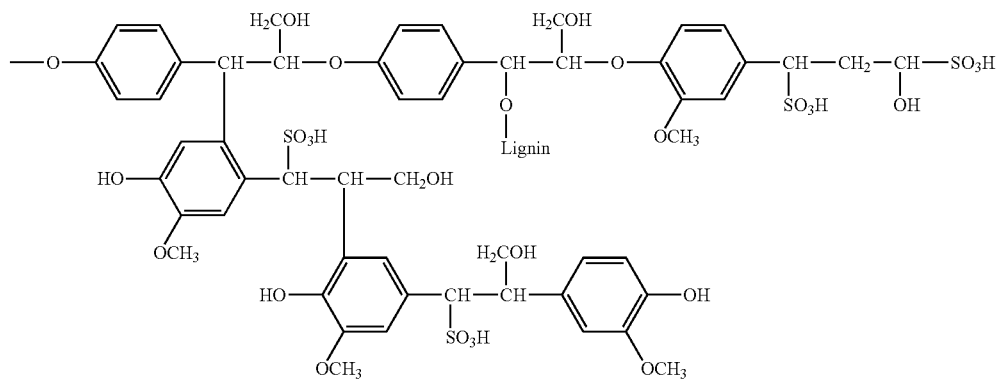

where n stands generally for 5 to 500. Lignosulfonates have molar weights of between 2000 and 100 000 g/mol. In general, they are present in the form of their sodium, calcium and/or magnesium salts. Examples of suitable lignosulfonates are the Borresperse products distributed by Borregaard LignoTech, Norway.

Suitable sulfonated ketone-formaldehyde condensates are products incorporating a monoketone or diketone as ketone component, preferably acetone, butanone, pentanone, hexanone or cyclohexanone. Condensates of this kind are known and are described in WO 2009/103579, for example. Sulfonated acetone-formaldehyde condensates are preferred. They generally comprise units of the formula (according to J. Plank et al., J. Appl. Poly. Sci. 2009, 2018-2024:

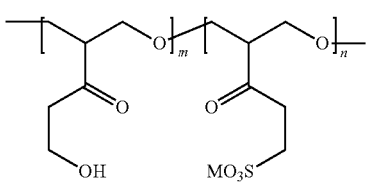

where m and n are generally each 10 to 250, M is an alkali metal ion, such as Na+, and the ratio m:n is in general in the range from about 3:1 to about 1:3, more particularly about 1.2:1 to 1:1.2. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable acetone-formaldehyde condensates are the Melcret K1L products distributed by BASF Construction Solutions GmbH.

Suitable sulfonated naphthalene-formaldehyde condensates are products obtained by sulfonation of naphthalene and subsequent polycondensation with formaldehyde. They are described in references including Concrete Admixtures Handbook—Properties, Science and Technology, 2. Ed., pages 411-413 and in Ullmann's Encyclopedia of Industrial Chemistry, 5th Ed., vol. A8, pages 587, 588. They comprise units of the formula

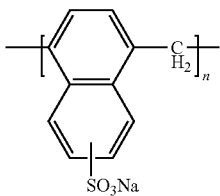

Typically, molar weights (Mw) of between 1000 and 50 000 g/mol are obtained. Furthermore, it is also possible for other aromatic units to be incorporated by condensation, such as gallic acid, aminobenzenesulfonic acid, sulfanilic acid, phenolsulfonic acid, aniline, ammoniobenzoic acid, dialkoxybenzenesulfonic acid, dialkoxybenzoic acid, pyridine, pyridinemonosulfonic acid, pyridinedisulfonic acid, pyridinecarboxylic acid and pyridinedicarboxylic acid. Examples of suitable β-naphthalene-formaldehyde condensates are the Melcret 500 L products distributed by BASF Construction Solutions GmbH.

Generally, phosphonate containing dispersants incorporate phosphonate groups and polyether side groups.

Suitable phosphonate containing dispersants are those according to the following formula R—(OA)$_n$—N—[CH$_2$—PO(OM$_2$)$_2$]$_2$ wherein
R is H or a hydrocarbon residue, preferably a C$_1$-C$_{15}$ alkyl radical,
A is independently C$_2$-C$_{18}$ alkylene, preferably ethylene and/or propylene, most preferably ethylene,
n is an integer from 5 to 500, preferably 10 to 200, most preferably 10 to 100, and
M is H, an alkali metal, ½ earth alkali metal and/or an amine;

Useful as dispersant are also cationic (co)polymers. The cationic (co)polymers comprise preferably
a) 3 to 100 mol-%, preferably 10 to 90 mol %, more preferably 25 to 75 mol % of a cationic structural unit of formula (V)

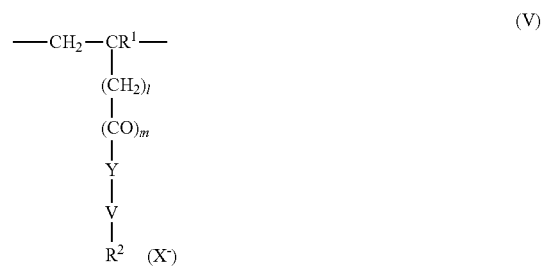

wherein
R$^1$ in each occurrence is the same or different and represents hydrogen and/or methyl,
R$^2$ in each occurrence is the same or different and is selected from the group consisting of:

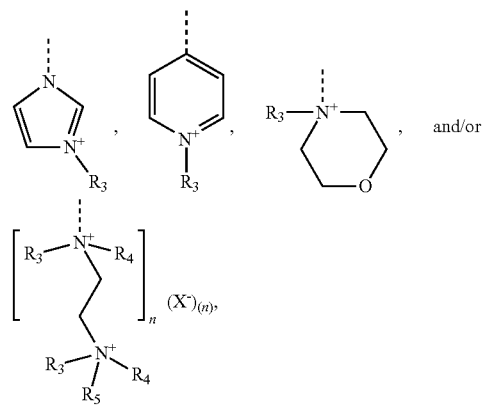

wherein
R$^3$, R$^4$ and R$^5$ in each occurrence are the same or different and each independently represent hydrogen, an aliphatic hydrocarbon moiety having 1 to 20 carbon atoms, a cycloaliphatic hydrocarbon moiety having 5 to 8 carbon atoms, aryl having 6 to 14 carbon atoms and/or a polyethylene glycol (PEG) moiety,
l in each occurrence is the same or different and represents an integer from 0 to 2,
m in each occurrence is the same or different and represents 0 or 1,
n in each occurrence is the same or different and represents an integer from 0 to 10,
Y in each occurrence is the same or different and represents an absent group, oxygen, NH and/or NR$^3$,
V in each occurrence is the same or different and represents —(CH$_2$)$_x$—,

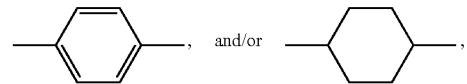

wherein
x in each occurrence is the same or different and represents an integer from 0 to 6, and (X⁻) in each occurrence is the same or different and represents a halogenide ion, a $C_{1-4}$-alkyl sulfate, a $C_{1-4}$-alkyl sulfonate, a $C_{6-14}$-(alk)aryl sulfonate and/or a monovalent equivalent of a polyvalent anion, which is selected from a sulfate, a disulfate, a phosphate, a diphosphate, a triphosphate and/or a polyphosphate.

Preferably the cationic (co)polymers comprises
b) from 0 to 97 mol-%, preferably 10 to 90 mol %, more preferably 25 to 75 mol %, of a macromonomeric structural unit of formula (VI)

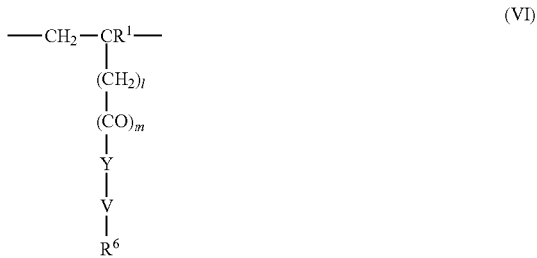

wherein
$R^6$ in each occurrence is the same or different and represents a polyoxyalkylene group of the following formula (VII)

wherein
o in each occurrence is the same or different and represents an integer from 1 to 300, and
$R^1$, $R^3$, l, m, Y, V, and x have the meanings given above, provided that, in both structural units (V) and (VI), Y represents an absent group when x is =0.

Preferably in the cationic (co)polymer the monomer components corresponding to the structural unit (V) are selected from quaternized N-vinylimidazole, quaternized N-allylimidazole, quaternized 4-vinylpyridine, quaternized 1-[2-(acryloyloxy)ethyl]-1H-innidazole, 1-[2-(methacryloyloxy)ethyl]-1H-imidazole, and mixtures thereof.

Preferably in the cationic (co)polymer the monomer components corresponding to the structural unit (VI) are selected from vinyl ethers, vinyloxy $C_{1-6}$-alkyl ethers, in particular vinyloxy butyl ethers, allyl ethers, methallyl ethers, 3-butenyl ethers, isoprenyl ethers, acrylic esters, methacrylic esters, acrylamides, methacrylamides, and mixtures thereof.

In the cationic (co)polymer o is preferably from 5 to 300, more preferably 10 to 200, and in particular 20 to 100.

In the cationic (co)polymer the oxyalkylene units of the polyoxyalkylene group of formula (VII) are preferably selected from ethylene oxide groups and/or propylene oxide groups, which are arranged randomly, alternatingly, graduatedly and/or blockwise within the polyoxyalkylene group.

The cationic (co)polymer is preferably characterized in that the polyoxyalkylene group of formula (VII) is a mixture with different values for o within the specified definition.

Preferable is the cationic (co)polymer comprising 10 to 90 mol-% of the cationic structural unit and 90 to 10 mol-% of the macromonomeric structural unit, preferably 25 to 75 mol-% of the cationic structural unit and 75 to 25 mol-% of the macromonomeric structural unit.

Preferably the cationic (co)polymer has a molecular weight in the range of from 1000 to 500000, preferably 2000 to 150000 and in particular 4000 to 100000 g/mol. Preferably the molecular weight is determined by the gel permeation chromatography method (GPC) as indicated in the experimental part.

The cationic (co)polymers are useful for dispersing aqueous suspensions of binders selected from the group comprising hydraulic binders and/or latent hydraulic binders. The latent hydraulic binder is preferably blast furnace slag.

The set control composition according to the invention can be present as a solution or dispersion, in particular an aqueous solution or dispersion. The solution or dispersion suitably has a solids content of 10 to 50% by weight, in particular 25 to 35% by weight. Alternatively, the set control composition according to the invention can be present as a powder which is obtainable, e.g., by drum-drying, spray drying or flash-drying. The set control composition according to the invention may be introduced into the mixing water or introduced during the mixing of the mortar or concrete.

The present invention also relates to construction material compositions or building material formulations which comprise at least one hydraulic binder and/or latent hydraulic binder and the set control composition of the invention.

The hydraulic binder is suitably selected from Portland cement, calcium aluminate cement and sulfoaluminate cement.

The mineralogical phases are indicated by their usual name followed by their cement notation. The primary compounds are represented in the cement notation by the oxide varieties: C for CaO, S for $SiO_2$, A for $Al_2O_3$, $ for $SO_3$, H for $H_2O$; this notation is used throughout.

The term "Portland cement" denotes any cement compound containing Portland clinker, especially CEM I, II, III, IV and V within the meaning of standard EN 197-1, paragraph 5.2. A preferred cement is ordinary Portland cement (OPC) according to DIN EN 197-1 which may either contain calcium sulfate (<7% by weight) or is essentially free of calcium sulfate (<1% by weight).

Calcium aluminate cement (also referred to as high aluminate cement) means a cement containing calcium aluminate phases. The term "aluminate phase" denotes any mineralogical phase resulting from the combination of aluminate (of chemical formula $Al_2O_3$, or "A" in cement notation), with other mineral species. The amount of alumina (in form of $Al_2O_3$) is ≥30% by weight of the total mass of the aluminate-containing cement as determined by means of X-ray fluorescence (XRF). More precisely, said mineralogical phase of aluminate type comprises tricalcium aluminate ($C_3A$), monocalcium aluminate (CA), mayenite ($C_{12}A_7$), tetracalcium aluminoferrite ($C_4AF$), or a combination of several of these phases.

Sulfoaluminate cement has a content of yeelimite (of chemical formula $4CaO.3Al_2O_3.SO_3$ or $C_4A_3$$ in cement notation) of greater than 15% by weight.

In an embodiment, the inorganic binder comprises a mixture of Portland cement and aluminate cement, or a mixture of Portland cement and sulfoaluminate cement or a mixture of Portland cement, aluminate cement and sulfoaluminate cement.

In an embodiment, where the construction chemical composition contains an aluminate-containing cement, the compositions may additionally contain at least one sulfate source, preferably calcium sulfate source. The calcium sulfate source may be selected from calcium sulfate dihydrate, anhydrite, α- and β-hemihydrate, i.e. α-bassanite and β-bassanite, or mixtures thereof. Preferably the calcium sulfate is α-bassanite and/or β-bassanite. In general, calcium sulfate is comprised in an amount of about 1 to about 20 weight %, based on the weight of the aluminate-containing cement. In an embodiment, the construction chemical composition additionally contains at least one alkali metal sulfate like potassium sulfate or sodium sulfate, or aluminum sulfate.

Preferably the latent hydraulic binder in the construction material composition is blast furnace slag.

Preferable are construction material compositions, which comprise a hydraulic binder and in which the weight percentage of sulfate with respect to the weight of clinker is from 4 to 14 weight %, preferably from 8 to 14 weight % most preferably from 9 to 13 weight %. The mass of sulfate is to be understood as the mass of the sulfate ion without the counterion. Preferably the sulfate is present in the form of calcium sulfate, more preferably in the form of α-bassanite and/or β-bassanite.

Addition of sulphate to hydraulic binders (cements), which are poor in the contents of sulphate helps to encourage the formation of ettringite and leads to a better early strength development.

The construction chemical compositions or building material formulations may also contain latent hydraulic binders and/or pozzolanic binders. For the purposes of the present invention, a "latent hydraulic binder" is preferably a binder in which the molar ratio $(CaO+MgO):SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof. The "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

The slag can be either industrial slag, i.e. waste products from industrial processes, or else synthetic slag. The latter can be advantageous because industrial slag is not always available in consistent quantity and quality.

Blast furnace slag (BFS) is a waste product of the glass furnace process. Other materials are granulated blast furnace slag (GBFS) and ground granulated blast furnace slag (GGBFS), which is granulated blast furnace slag that has been finely pulverized. Ground granulated blast furnace slag varies in terms of grinding fineness and grain size distribution, which depend on origin and treatment method, and grinding fineness influences reactivity here. The Blaine value is used as parameter for grinding fineness, and typically has an order of magnitude of from 200 to 1000 $m^2$ $kg^{-1}$, preferably from 300 to 600 $m^2$ $kg^{-1}$. Finer milling gives higher reactivity.

For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Electrothermal phosphorous slag is a waste product of electrothermal phosphorous production. It is less reactive than blast furnace slag and comprises about 45 to 50% by weight of CaO, about 0.5 to 3% by weight of MgO, about 38 to 43% by weight of $SiO_2$, about 2 to 5% by weight of $Al_2O_3$ and about 0.2 to 3% by weight of $Fe_2O_3$, and also fluoride and phosphate. Steel slag is a waste product of various steel production processes with greatly varying composition.

Amorphous silica is preferably an X ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m_2$ $g^{-1}$.

Microsilica is a by-product of silicon production or ferrosilicon production, and likewise consists mostly of amorphous $SiO_2$ powder. The particles have diameters of the order of magnitude of 0.1 μm. Specific surface area is of the order of magnitude of from 10 to 30 $m^2$ $g^{-1}$.

Fly ash is produced inter alia during the combustion of coal in power stations. Class C fly ash (brown-coal fly ash) comprises according to WO 08/012438 about 10% by weight of CaO, whereas class F fly ash (hard-coal fly ash) comprises less than 8% by weight, preferably less than 4% by weight, and typically about 2% by weight of CaO.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin ($Al_2Si_2O_7$). Accordingly pure metakaolin comprises about 54% by weight of $SiO_2$ and about 46% by weight of $Al_2O_3$.

For the purposes of the present invention, aluminosilicates are the abovementioned reactive compounds based on $SiO_2$ in conjunction with $Al_2O_3$ which harden in an aqueous alkali environment. It is of course not essential here that silicon and aluminium are present in oxidic form, as is the case by way of example in $Al_2Si_2O_7$. However, for the purposes of quantitative chemical analysis of aluminosilicates it is usual to state the proportions of silicon and aluminium in oxidic form (i.e. as "$SiO_2$" and "$Al_2O_3$").

In case construction material composition contain low amount of hydraulic binder (e.g. ≤10%) an alkaline activator can be further added to promote strength development. Alkaline activators are preferably used in the binder system, such alkaline activators are for example aqueous solutions of alkali metal fluorides, alkali metal hydroxides, alkali metal aluminates or alkali metal silicates, such as soluble waterglass, and mixtures thereof.

The construction material composition can be for example concrete, mortar or grouts. The term "cement paste" denotes the construction material composition admixed with water.

The term "mortar" or "grout" denotes a cement paste to which are added fine granulates, i.e. granulates whose diameter is between 150 μm and 5 mm (for example sand), and optionally very fine granulates. A grout is a mixture of sufficiently low viscosity for filling in voids or gaps. Mortar viscosity is high enough to support not only the mortar's own weight but also that of masonry placed above it. The term "concrete" denotes a mortar to which are added coarse granulates, i.e. granulates with a diameter of greater than 5 mm.

The aggregate in this invention can be for example silica, quartz, sand, crushed marble, glass spheres, granite, limestone, sandstone, calcite, marble, serpentine, travertine, dolomite, feldspar, gneiss, alluvial sands, any other durable aggregate, and mixtures thereof. The aggregates are often also called fillers and in particular do not work as a binder.

The invention relates also to the use of a set control composition according to this invention for prolonging the open time of aqueous compositions containing at least one hydraulic binder and/or latent hydraulic binder.

The invention also concerns the use of the set control compositions according to this invention for producing building products, in particular for concretes such as on-site concrete, finished concrete parts, pre-cast concrete parts, concrete goods, cast concrete stones, concrete bricks, in-situ concrete, sprayed concrete (shotcrete), ready-mix concrete, air-placed concrete, concrete repair systems, industrial cement flooring, one-component and two-component sealing slurries, slurries for ground or rock improvement and soil conditioning, screeds, filling and self-levelling compositions, such as joint fillers or self-levelling underlayments, adhesives, such as building or construction adhesives, thermal insulation composite system adhesives, tile adhesives, renders, plasters, adhesives, sealants, coating and paint systems, in particular for tunnels, waste water drains, splash protection and condensate lines, screeds, mortars, such as dry mortars, sag resistant, flowable or self-levelling mortars, drainage mortars, or repair mortars, grouts, such as joint grouts, non-shrink grouts, tile grouts, injection grouts, windmill grouts, anchor grouts, flowable or self-levelling grouts, ETICS (external thermal insulation composite systems), EIFS grouts (Exterior Insulation Finishing Systems, swelling explosives, waterproofing membranes or cementitious foams.

EXAMPLES

In the examples the following materials and methods were used:

Dispersant 1: The dispersant is a PCE, more specifically a copolymer of 4-hydroxybutyl monovinyl ether ethoxylated with 64 moles of ethylene oxide in average and acrylic acid in a ratio of 1/10.

Dispersant 2: The dispersant is a polycondensation product of poly(ethyleneoxide)monophenylether, phosphorylated phenoxyethanol and formaldehyde. It was synthesized according to Example 7 (Table 1) in WO 2015/091461.

Dispersant 3: The dispersant is a polycondensation product of poly(ethyleneoxide)monophenylether, phosphorylated phenoxyethanol and formaldehyde. It was synthesized according to Example 1 (Table 1) in WO 2015/091461.

PMAA: poly(methacrylic acid, sodium salt, average $M_w$ 4,000-6,000, 40 wt. % aqueous solution (manufacturer Aldrich).

Polyacrylamide is a homopolymer of acrylamide obtained by radical polymerization. The molecular weight is 13500 g/mol (obtained by aqueous GPC as explained in detail below).

Cublen P50: 2-Phosphonobutane-1,2,4-tricarboxylic acid

Gel permeation chromatography method (GPC):

Column combination: OH-Pak SB-G, OH-Pak SB 804 HQ and OH-Pak SB 802.5 HQ by Shodex, Japan; eluent: 80 Vol.-% aqueous solution of $HCO_2NH_4$ (0.05 mol/l) and 20 vol.-% methanol; injection volume 100 µl; flow rate 0.5 ml/min. The molecular weight calibration was performed with poly(acrylate) standards for the RI detector. Standards were purchased from PSS Polymer Standards Service, Germany.

Amine-glyoxylic acid condensates (retarder Component (a)) were synthesized according the following recipes:

Synthetic Procedure A

Glyoxylic acid (amount is given according to table 1 as 100% glyoxylic acid) was added into a vessel and neutralized to the appropriate starting pH (table 1) with potassium hydroxide. All other ingredients were added. The mixture was heated to 80° C. and the water was separated with a water trap. After 7 h, the highly viscous substance was analyzed by gel permeation chromatography method (GPC) as described below.

Synthetic Procedure B

Glyoxylic acid (50% solution in water) (amount is given according to table 1 as 100% glyoxylic acid) was added into a vessel and neutralized to the appropriate starting pH (table 1) with potassium hydroxide. After adding all other components, the mixture was heated to 80° C. After 7 h, the highly viscous substance was analyzed by gel permeation chromatography method (GPC) as described below.

Synthetic Procedure C

Glyoxylic acid was used as a 50% solution in water (amount is given according to table 1 as 100% glyoxylic acid). It was added into a vessel and neutralized to the appropriate starting pH (table 1) with potassium hydroxide. After adding all other components, the mixture was stirred for 2 h. After 2 h, the highly viscous substance was analyzed by gel permeation chromatography method (GPC) as described below.

TABLE 1

| Retarder | Glyoxylic acid [g] | Melamine [g] | Sulfanilic acid [g] | Urea [g] | Polyacrylamide | Guanidinium Carbonate [g] | Start pH | Synth. proc. | Mol. weight [g/mol] | Temp. [° C.] |
|---|---|---|---|---|---|---|---|---|---|---|
| 1 | 18.52 | — | — | 10.0 | — | — | 3.8 | A | 2300 | 75 |
| 2 | 13.64 | 10.50 | 7.35 | 5.0 | — | — | 4 | B | 7000 | 75 |
| 3 | 14.81 | — | — | 10.0 | — | — | 5 | B | 1500 | 75 |
| 4 | 14.81 | — | — | 10.0 | — | — | 3.7 | B | 1000 | 75 |
| 5 | 12.34 | — | — | 10.0 | — | — | 3.8 | B | 7000 | 75 |
| 6 | 14.81 | — | — | 10.0 | — | — | 3.8 | B | 6000 | 25 |
| 7 | 14.81 | — | — | 10.0 | — | — | 5 | B | 6100 | 25 |
| 8 | 14.81 | — | — | 10.0 | — | — | 6 | B | 6300 | 25 |
| 9 | 14.81 | — | — | 10.0 | — | — | 7 | B | 6500 | 25 |

TABLE 1-continued

| Retarder | Glyoxylic acid [g] | Melamine [g] | Sulfanilic acid [g] | Urea [g] | Polyacrylamide | Guanidinium Carbonate [g] | Start pH | Synth. proc. | Mol. weight [g/mol] | Temp. [° C.] |
|---|---|---|---|---|---|---|---|---|---|---|
| 10 | 5.49 | — | — | — | — | 10.0 | 3.6 | B | 750 | 25 |
| 11 | 5.49 | — | — | — | — | 10.0 | 0 | B | 3000 | 25 |
| 12 | 12.34 | — | — | 10.0 | — | — | 5 | B | 3100 | 25 |
| 13 | 10.43 | — | — | — | 10.0 | — | 7 | C | 19000 | 25 |

These amine-glyoxylic acid condensates were tested in a mortar along the lines of DIN EN 1015.

The cement mortar was compounded with a sand/cement ration of s/c=2 (CEM I 52.5 N). The sand was a mixture of 70% norm sand and 30% quartz sand. The water/cement weight ratio was 0.42. The amount of additives added are summarized in table 2. The dosage of the dispersant was adjusted to achieve a spread of 24±1 cm. The spread was determined using a Haegerman cone. Immediately after mixing the cone is completely filled with applying 15 strokes after lifting the cone, and the spread of the mortar measured.

The cement mortar was prepared in a 5 L RILEM mixer. The mixer was charged with cement and sand. Thereafter, mixing was started at low speed (140 rpm). After 30 s mixing water and the therein dissolved additives was uniformly added to the mixture. The mixing speed was then increased (285 rpm) and continued for 90 s.

The "time until spread <22 cm" was determined as follows: Since in retarded cement systems, set and loss of flowability are closely connected, an initial set time was determined with a Vicat apparatus according to DIN EN 196-3. Spread testing was started 15 minutes before the predetermined initial set time and was repeated every 10 minutes until the spread was <22 cm. During the initial 20 minutes, the spread test was repeated every 5 minutes.

The results of the mortar testing are summarized in tables 2 and 2.1.

Table 2 shows the synergistic effects of components (a) and (b) in the absence of c).

TABLE 2

| No. | Dispersant [% bwoc] | Retarder Component (a) [% bwoc] | | Retarder Component (b) [% bwoc] | |
|---|---|---|---|---|---|
| 33* | 1 | 0.125 | — | — | Modified starch | 0.05 |
| 34* | 1 | 0.135 | — | — | Sodium Gluconate | 0.05 |
| 35* | 1 | 0.255 | — | — | — | — |
| 50* | 1 | 0.29 | 7 | 0.19 | — | — |
| 44* | 1 | 0.29 | — | — | Sodium Carbonate | 0.19 |
| 45* | 1 | 0.29 | — | — | Propylene Carbonate | 0.19 |
| 41 | 1 | 0.07 | 1 | 0.19 | Sodium Carbonate | 0.19 |
| 51 | 1 | 0.07 | 7 | 0.19 | Propylene Carbonate | 0.19 |

*Denotes a comparative example.

TABLE 2.1

| Exp. No. | Time until spread < 22 cm [min] | Final set [min] | 4 h strength [MPa] | 24 h strength [MPa] |
|---|---|---|---|---|
| 33* | 10 | 305 | nm | 19.1 |
| 34* | 10 | 347 | nm | 20.3 |
| 35* | 10 | 347 | nm | 20.4 |
| 50* | 10 | 312 | nm | 9 |
| 44* | 10 | 314 | nm | 5.5 |
| 45* | 10 | 301 | nm | 5.5 |
| 41 | 15 | 54 | 1.0 | 18.1 |
| 51 | 30 | 100 | 1.0 | 4.5 |

*denotes a comparative example.
nm denotes that the data were not measurable (too small).

This set of experiments shows that only the combination of component a) and component b) (41 and 51) shows sufficient open time combined with measurable strength after 4 h and a significant increase in the 24 h strength.

Component a) (50*) and component b) (44*, 45*) alone give no measurable strength after 4 h and reduce the 24 h strength tremendously in comparison to the examples according to the invention (41 and 51).

Table 3 shows the synergistic effect of components (a), (b) and (c).

TABLE 3

| No. | Dispersant [% bwoc] | Retarder Component (a) [% bwoc] | | Retarder Component (b) [% bwoc] | | Component (c) [% bwoc] | |
|---|---|---|---|---|---|---|---|
| 51 | 1 | 0.07 | 7 | 0.19 | Propylene Carbonate | 0.19 | — | — |
| 10 | 1 | 0.07 | 7 | 0.19 | Propylene Carbonate | 0.19 | PMAA | 0.125 |
| 52* | 1 | 0.29 | 7 | 0.19 | — | — | PMMA | 0.125 |
| 36* | 1 | 0.29 | — | — | Sodium Carbonate | 0.19 | PMAA | 0.125 |
| 37* | 1 | 0.29 | — | — | Propylene Carbonate | 0.19 | PMAA | 0.125 |
| 39 | 1 | 0.07 | 1 | 0.19 | Sodium Carbonate | 0.19 | Sodium Gluconate | 0.125 |
| 40 | 1 | 0.07 | 1 | 0.19 | Sodium Carbonate | 0.19 | Sodium Tartrate | 0.125 |
| 1 | 1 | 0.07 | 1 | 0.19 | Propylene Carbonate | 0.25 | Cublen P50 | 0.125 |
| 41 | 1 | 0.07 | 1 | 0.19 | Sodium Carbonate | 0.19 | — | — |
| 8* | 1 | 0.07 | 6 | 0.19 | Citric acid | 0.19 | PMAA | 0.125 |

TABLE 3.1

| Exp. No. | Time until spread < 22 cm [min] | Final set [min] | 4 h strength [MPa] | 24 h strength [MPa] |
|---|---|---|---|---|
| 51 | 30 | 100 | 1 | 4.5 |
| 10 | 113 | 163 | 2.1 | 7.6 |
| 52* | 30 | 360 | nm | 2 |

TABLE 3.1-continued

| Exp. No. | Time until spread < 22 cm [min] | Final set [min] | 4 h strength [MPa] | 24 h strength [MPa] |
|---|---|---|---|---|
| 36* | 10 | 83 | nm | 19.6 |
| 37* | 10 | 352 | nm | 20.1 |
| 39 | 210 | 398 | 1.0 | 6.0 |
| 40 | 60 | 78 | 4 | 12.0 |
| 1 | 140 | 145 | 0.5 | 5.3 |
| 41 | 15 | 54 | 1.0 | 18.1 |
| 8* | 10 | 19 | 2 | 4.6 |

This set of experiments shows that the addition of component c) to a mixture of component a) and b) (examples 10, 39, 40, 1) increases the open time strongly under preservation of 4 h strength. If one of a) or b) is missing, no 4 h strength can be measured (comparative examples 52*, 36* and 37*).

Tables 4 and 4.1 show the performance of different retarder components a) in the presence of b) and c).

TABLE 4

| No. | Dispersant [% bwoc] | Retarder Comp. (a) | | Retarder Comp. (b) [% bwoc] | | Component (c) | [% bwoc] |
|---|---|---|---|---|---|---|---|
| 2 | 1 | 0.07 | 1 | 0.19 | Propylene Carbonate | 0.19 PMAA | 0.125 |
| 3 | 1 | 0.07 | 2 | 0.19 | Propylene Carbonate | 0.19 PMAA | 0.125 |
| 4 | 1 | 0.07 | 3 | 0.19 | Propylene Carbonate | 0.19 PMAA | 0.125 |
| 5 | 1 | 0.07 | 4 | 0.19 | Propylene Carbonate | 0.19 PMAA | 0.125 |
| 6 | 1 | 0.07 | 5 | 0.19 | Propylene Carbonate | 0.19 PMAA | 0.125 |
| 9 | 1 | 0.07 | 6 | 0.19 | Propylene Carbonate | 0.19 PMAA | 0.125 |
| 10 | 1 | 0.07 | 7 | 0.19 | Propylene Carbonate | 0.19 PMAA | 0.125 |
| 23 | 1 | 0.07 | 10 | 0.19 | Propylene Carbonate | 0.19 PMAA | 0.125 |
| 24 | 1 | 0.07 | 11 | 0.19 | Propylene Carbonate | 0.19 PMAA | 0.125 |
| 25 | 1 | 0.07 | 12 | 0.19 | Propylene Carbonate | 0.19 PMAA | 0.125 |
| 42 | 1 | 0.14 | 13 | 0.3 | Sodium Carbonate | 0.19 PMAA | 0.125 |

TABLE 4.1

| Exp. No. | Time until spread < 22 cm [min] | Final set [min] | 4 h strength [MPa] | 24 h strength [MPa] |
|---|---|---|---|---|
| 2 | 100 | 155 | 0.7 | 6.3 |
| 3 | 109 | 155 | 0.7 | 3.9 |
| 4 | 98 | 134 | 0.6 | 5.2 |
| 5 | 103 | 125 | 0.7 | 5.5 |
| 6 | 110 | 139 | 0.8 | 3.0 |
| 9 | 108 | 142 | 0.7 | 8.4 |
| 10 | 113 | 163 | 2.1 | 7.6 |
| 23 | 100 | 120 | 2.5 | 15.8 |
| 24 | 71 | 117 | 2.4 | 16.0 |
| 25 | 130 | 173 | 0.8 | 8.3 |
| 42 | 60 | 135 | 1.8 | 14.0 |

It can be seen that the open time as well as the 4 h strength values are throughout good.

Tables 5 and 5.1 show the influence of the carbonate source.

TABLE 5

| No. | Dispersant [% bwoc] | Retarder Comp. (a) | | Retarder Comp. (b) [% bwoc] | | Component (c) | [% bwoc] |
|---|---|---|---|---|---|---|---|
| 10 | 1 | 0.07 | 7 | 0.19 | Propylene Carbonate | 0.19 PMAA | 0.125 |
| 11 | 1 | 0.07 | 7 | 0.19 | Sodium Carbonate | 0.19 PMAA | 0.125 |
| 12 | 1 | 0.07 | 7 | 0.47 | Magnesium Carbonate | 0.03 PMAA | 0.125 |
| 13 | 1 | 0.07 | 7 | 0.30 | Sodium Carbonate | 0.30 PMAA | 0.125 |
| 14 | 1 | 0.07 | 7 | 0.19 | Sodium Carbonate | 0.30 PMAA | 0.125 |
| 15 | 1 | 0.055 | 7 | 0.19 | Sodium Carbonate | 0.30 PMAA | 0.125 |
| 16 | 1 | 0.045 | 7 | 0.19 | Sodium Carbonate | 0.30 PMAA | 0.125 |
| 17 | 1 | 0.07 | 7 | 0.30 | Sodium Carbonate | 0.19 PMAA | 0.125 |
| 18 | 1 | 0.07 | 7 | 0.47 | Magnesium carbonate | 0.03 PMAA | 0.125 |
| 19 | 1 | 0.07 | 7 | 0.47 | Magnesium carbonate | 0.03 PMAA | 0.125 |
| 20 | 1 | 0.07 | 7 | 0.475 | Magnesium carbonate | 0.025 PMAA | 0.125 |
| 21 | 1 | 0.07 | 7 | 0.44 | Magnesium carbonate | 0.06 PMAA | 0.125 |
| 22 | 1 | 0.07 | 7 | 0.88 | Magnesium carbonate | 0.12 PMAA | 0.125 |
| 27 | 1 | 0.07 | 7 | 0.30 | Propylene Carbonate | 0.30 PMAA | 0.125 |
| 28 | 1 | 0.07 | 7 | 0.40 | Propylene Carbonate | 0.40 PMAA | 0.125 |
| 29 | 1 | 0.07 | 7 | 0.50 | Propylene Carbonate | 0.50 PMAA | 0.125 |
| 30 | 3 | 0.25 | 7 | 0.19 | Propylene Carbonate | 0.19 PMAA | 0.125 |
| 31 | 2 | 0.08 | 7 | 0.19 | Propylene Carbonate | 0.19 PMAA | 0.125 |
| 32 | | | 7 | 0.19 | Sodium Carbonate | 0.19 PMAA | 0.350 |
| 36* | 1 | 0.29 | — | — | Sodium Carbonate | 0.19 PMAA | 0.125 |
| 37* | 1 | 0.29 | — | — | Propylene Carbonate | 0.19 PMAA | 0.125 |
| 38 | 1 | 0.07 | 1 | 0.25 | Sodium Borate | 0.25 PMAA | 0.125 |
| 39 | 1 | 0.07 | 1 | 0.19 | Sodium Carbonate | 0.19 Sodium Gluconate | 0.125 |
| 40 | 1 | 0.07 | 1 | 0.19 | Sodium Carbonate | 0.19 Sodium Tartrate | 0.125 |
| 41 | 1 | 0.07 | 1 | 0.19 | Sodium Carbonate | 0.19 — | — |
| 2 | 1 | 0.07 | 1 | 0.19 | Propylene Carbonate | 0.19 PMAA | 0.125 |
| 53* | 1 | 0.07 | 7 | 0.19 | Calcium Carbonate | 0.19 PMAA | 0.125 |

TABLE 5.1

| Exp No | Time until spread < 22 cm [min] | Final set [min] | 4 h strength [MPa] | 24 h strength [MPa] |
|---|---|---|---|---|
| 10 | 113 | 163 | 2.1 | 7.6 |
| 11 | 40 | 54 | 2 | 14.5 |
| 12 | 40 | 55 | 0.7 | 9.3 |
| 13 | 120 | 171 | 3 | 15.7 |
| 14 | 90 | 117 | 1.5 | 16.7 |
| 15 | 50 | 71 | 1.6 | 16.8 |
| 16 | 50 | 69 | 2.5 | 16.5 |
| 17 | 60 | 108 | 1.6 | 16.2 |
| 18 | 55 | 65 | 0.6 | 10.9 |
| 19 | 46 | 54 | 0.6 | 9.3 |
| 20 | 67 | 81 | 0.6 | 10.0 |
| 21 | 41 | 50 | 0.6 | 9.7 |

TABLE 5.1-continued

| Exp No | Time until spread < 22 cm [min] | Final set [min] | 4 h strength [MPa] | 24 h strength [MPa] |
|---|---|---|---|---|
| 22 | 98 | 118 | 2.31 | 13.3 |
| 27 | 121 | 172 | 2.5 | 6.8 |
| 28 | 134 | 197 | 1.2 | 5.2 |
| 29 | 142 | 201 | 1.0 | 4.6 |
| 30 | 101 | 122 | 0.8 | 4.7 |
| 31 | 95 | 117 | 1.8 | 16.1 |
| 32 | 120 | 210 | 0.6 | 4.0 |
| 36* | 10 | 83 | nm | 19.6 |
| 37* | 10 | 352 | nm | 20.1 |
| 38 | 50 | 72 | 0.7 | 11.6 |
| 39 | 210 | 398 | 1.0 | 6.0 |
| 40 | 60 | 78 | 4 | 12.0 |
| 41 | 15 | 54 | 1.0 | 18.1 |
| 2 | 100 | 155 | 0.7 | 6.3 |
| 53* | Not adjustable | >1 d | 0 | 0 |

This set of experiments shows the broad applicability of inorganic carbonates.

Table 6 shows the influence of the pH on the performance of the set control compositions. The pH was adjusted with $H_2SO_4$.

TABLE 6

| No | pH | Dispersant 1 [% bwoc] | Retarder Component (a) [% bwoc] | | Retarder Component (b) [% bwoc] | | Component (c) [% bwoc] |
|---|---|---|---|---|---|---|---|
| 11 | 11.2 | 1 | 0.07 | 7 | 0.19 | Sodium Carbonate | 0.19 PMAA 0.125 |
| 46 | 6 | 1 | 0.07 | 7 | 0.19 | Sodium Carbonate | 0.19 PMAA 0.125 |
| 47 | 7 | 1 | 0.07 | 7 | 0.19 | Sodium Carbonate | 0.19 PMAA 0.125 |
| 48 | 8 | 1 | 0.07 | 7 | 0.19 | Sodium Carbonate | 0.19 PMAA 0.125 |

TABLE 6.1

| Exp. No. | Time until spread < 22 cm [min] | Final set [min] | 4 h strength [MPa] | 24 h strength [MPa] |
|---|---|---|---|---|
| 11 | 40 | 54 | 2 | 14.5 |
| 46 | 10 | 45 | nm | 2.8 |
| 47 | 30 | 48 | 0.4 | 4 |
| 48 | 35 | 52 | 0.7 | 7.1 |

This set of experiments show the importance of the pH of the formulation on the performance in mortar. The performance increases with a higher pH. For the example 46 it is supposed that at a pH as low as 6, the carbonate is no more stable and the carbonate may have partially disappeared from the composition in the form of carbon dioxide. nm=not measurable (below detection limit)

The inventive examples according to tables 1 to 6 exhibit a fairly high time until spread <22 cm which is indicative of a prolonged open time. Comparative examples 8*, and 33* through 37* lacking either a borate or carbonate source (example 8*) or the amine-glyoxylic acid condensate (examples 33* through 37*) show an insufficient time until spread <22 cm.

The cementitious mortar was prepared in a 5 L RILEM mixer. The mixer was charged with cement, aggregate and sand. Thereafter, mixing was started at low speed (140 rpm). After 30 s mixing water and the therein dissolved additives were uniformly added to the mixture. The mixing speed was then increased (285 rpm) and continued for 90 s.

The slump was determined using a cone with height of 15 cm and an internal diameter at the top of 5 cm and 10 cm at the bottom. The cone was completely filled immediately after mixing, the cone was lifted, and the slump of the mortar measured.

TABLE 7

| Fillers Calcit MS-12 Pa.1 | 134.43 g |
| CEM I 42.5 R Karlstadt | 1075.44 g |
| Quarz 0.1/0.3 | 250.22 g |
| Quarz 0.3/1 | 200.17 g |
| Sand 0/4 | 2175.13 g |
| Crushed gravel 2/5 | 565.00 g |

In another experiment the influence of calcium sulfate is demonstrated (tables 8 and 8.1).

TABLE 8

| Dispersant 1 | Retarder 7 | NaHCO3 | Na-Gluconate | Anhydride (CaSO4) |
|---|---|---|---|---|
| 0.16 | — | — | — | — |
| 0.10% | 0.30% | 0.475% | 0.10% | — |
| 0.1 | 0.3 | 0.475% | 0.10% | 10% |

TABLE 8.1

| Slump [cm] | | | Compressive strength [MPa] | | |
|---|---|---|---|---|---|
| 5 min | 30 min | 45 min | 2 h | 5 h | 24 h |
| 12.2 | 8.1 | 7.5 | 0 | 0 | 25.2 |
| 11.6 | 10.8 | 10.5 | 2.1 | 2.3 | 7.2 |
| 11.6 | 12 | 7.5 | 4.5 | 5.0 | 14.0 |

This set of experiments shows the influence of additional amounts of a sulfate source. The very early strength profile is improved by 2 to 3 MPa at 2 h and 5 h respectively. The 24 strength is improved by 100%.

The effect of the invented additive composition in construction materials composition based on latent-hydraulic binder is demonstrated in a mortar experiment with the following recipe (table 9). Ground granulated blast furnace slag (GGBFS) is used as latent-hydraulic binder. Fly ash is added as pozzolanic binder component and alkaline activator (mixture of NaOH and $Na_2SiO_3$) is added as a typical hardening accelerator for non-hydraulic binders. The alkaline activator (NaOH solution and $Na_2SiO_3$) is dissolved in the mixing water.

TABLE 9

| GGBFS | 480 g |
| Fly Ash (Class F) | 120 g |
| Normsand | 1350 g |
| NaOH (20 wt.-% solution) | 3 g |
| $Na_2SiO_3$ | 1.5 g |
| Water | 260 g |

The mortar was prepared in a 5 L RILEM mixer. The mixer was charged with the powder binder components and sand. Thereafter, mixing was started at low speed (140 rpm). After 30 s mixing water and the therein dissolved alkaline activator and additives were uniformly added to the mixture. The mixing speed was then increased (285 rpm) and continued for 90 s.

The spread was determined using a Haegerman cone. The cone is completely filled with applying 15 strokes immediately after lifting the cone and the spread of the mortar measured (table 9.1).

TABLE 9.1

| Retarder 7 (% bwoGGBFS) | Na$_2$CO$_3$ (% bwoGGBFS) | Spread after 5 min (cm) | Spread after 30 min (cm) |
|---|---|---|---|
| 0 | 5.42 | 19 | 17 |
| 5.42 | 0 | 18 | 17 |
| 1.25 | 4.17 | 22 | 22 |

There is a clear synergistic effect between component A (Retarder 7) and component B (sodium carbonate), as claimed by the invention, on the flowability retention of construction materials composition based on latent-hydraulic binder.

The invention claimed is:

1. A set control composition for cementitious systems comprising
    a) an amine-glyoxylic acid condensate and
    b) at least one of (i) a borate source or (ii) a carbonate source, wherein the carbonate source is selected from the group consisting of inorganic carbonates having an aqueous solubility of 0.1 gL$^{-1}$ or more, organic carbonates, and mixtures thereof.

2. The composition according to claim 1, wherein the set control composition is an aqueous system and has a pH higher than or equal to 6.5, or the set control composition is a powder and develops a pH higher than or equal to 6.5 when an aqueous system is formed from the powder by adding water to the powder.

3. The composition according to claim 1, wherein the amine-glyoxylic acid condensate is selected from the group consisting of a melamine-glyoxylic acid condensate, a urea-glyoxylic acid condensate, a melamine-urea-glyoxylic acid condensate, a polyacrylamide-glyoxylic acid condensate, and mixtures thereof.

4. The composition according to claim 1, wherein the inorganic carbonate having an aqueous solubility of 0.1 gL$^{-1}$ or more is selected from the group consisting of potassium carbonate, sodium carbonate, lithium carbonate, magnesium carbonate, and mixtures thereof.

5. The composition according to claim 1, wherein the organic carbonate is selected from the group consisting of ethylene carbonate, propylene carbonate, and mixtures thereof.

6. The composition according to claim 1, wherein the borate source is selected from the group consisting of borax, boric acid, sodium tetraborate, and mixtures thereof.

7. The composition according to claim 1 additionally comprising a component selected from the group consisting of:
    polycarboxylic acids or salts thereof whose milliequivalent number of carboxyl groups is 5.00 meq/g or higher, assuming all the carboxyl groups to be in unneutralized form;
    phosphonates which comprise two or three phosphonate groups and no carboxyl groups
    α-hydroxy carboxylic acids or salts thereof
    and mixtures thereof.

8. The composition according to claim 7, wherein the polycarboxylic acid is selected from the group consisting of phosphonoalkyl carboxylic acids, amino carboxylic acids, polymeric carboxylic acids, and mixtures thereof.

9. The composition according to claim 1 additionally comprising a dispersant.

10. The composition according to claim 9, wherein the dispersant is selected from the group consisting of:
    comb polymers having a carbon-containing backbone to which are attached pendant cement-anchoring groups and polyether side chains,
    non-ionic comb polymers having a carbon-containing backbone to which are attached pendant hydrolysable groups and polyether side chains, the hydrolysable groups upon hydrolysis releasing cement-anchoring groups,
    sulfonated melamine-formaldehyde condensates,
    lignosulfonates,
    sulfonated ketone-formaldehyde condensates,
    sulfonated naphthalene-formaldehyde condensates,
    phosphonate containing dispersants,
    cationic (co)polymers and
    mixtures thereof.

11. A construction material composition comprising at least one hydraulic binder and/or latent hydraulic binder and a set control composition according to claim 1.

12. The construction material composition according to claim 11, wherein the hydraulic binder is selected from the group consisting of Portland cement, calcium aluminate cement, sulfoaluminate cement, and mixtures thereof.

13. The construction material composition according to claim 11, wherein the latent hydraulic binder is blast furnace slag.

14. The construction material composition according to claim 11, wherein the hydraulic binder contains clinker and a weight percentage of sulfate with respect to the weight of clinker is from 4 to 14 weight %.

15. The composition according to claim 7, wherein the polycarboxylic acids or salts thereof whose milliequivalent number of carboxyl groups is 5.00 to 15.00 meq/g, assuming all the carboxyl groups to be in unneutralized form.

16. The composition according to claim 10, wherein the phosphate containing dispersants comprise at least one polyalkylene glycol unit.

17. A method of prolonging the open time of aqueous compositions containing at least one hydraulic binder and/or latent hydraulic binder comprising adding the set control composition of claim 1 to the aqueous compositions containing at least one hydraulic binder and/or latent hydraulic binder.

* * * * *